(12) United States Patent
Gabe et al.

(10) Patent No.: US 7,448,203 B2
(45) Date of Patent: Nov. 11, 2008

(54) EXHAUST GAS DECONTAMINATION SYSTEM AND METHOD OF EXHAUST GAS DECONTAMINATION

(75) Inventors: Masashi Gabe, Fujisawa (JP); Daiji Nagaoka, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/501,405

(22) PCT Filed: Feb. 10, 2003

(86) PCT No.: PCT/JP03/01382

§ 371 (c)(1),
(2), (4) Date: Jul. 15, 2004

(87) PCT Pub. No.: WO03/069137

PCT Pub. Date: Aug. 21, 2003

(65) Prior Publication Data

US 2005/0102997 A1    May 19, 2005

(30) Foreign Application Priority Data

Feb. 12, 2002    (JP)    ............................. 2002-033740

(51) Int. Cl.
*F02M 25/06*    (2006.01)
(52) U.S. Cl. .............................. 60/278; 60/274; 60/285; 60/300; 60/295
(58) Field of Classification Search ................... 60/274, 60/276, 277, 278, 285, 286, 301, 300, 295, 60/303
See application file for complete search history.

(56) References Cited

U.S. PATENT DOCUMENTS

| 5,992,142 | A | * | 11/1999 | Pott | ............................. 60/274 |
| 6,164,064 | A | * | 12/2000 | Pott | ............................. 60/277 |
| 6,233,925 | B1 | * | 5/2001 | Hirota et al. | ................... 60/285 |

(Continued)

FOREIGN PATENT DOCUMENTS

JP    6-317142    11/1994

(Continued)

OTHER PUBLICATIONS

Patent Abstracts of Japan for Publication No. 2001-65397, dated Mar. 13, 2001 (1 page).

(Continued)

*Primary Examiner*—Tu M. Nguyen
(74) *Attorney, Agent, or Firm*—Staas & Halsey LLP

(57) ABSTRACT

An exhaust gas decontamination system and a method of exhaust gas decontamination wherein in the regeneration of $NO_x$ occlusion reduction type catalyst with respect to a lean-burn engine or diesel engine, even in the instance of rich burning accompanied by EGR the $NO_x$ released from the $NO_x$ occlusion reduction type catalyst can satisfactorily be reduced and purged to thereby exhibit a high $NO_x$ removal ratio. The exhaust gas decontamination system (1) provided with the $NO_x$ occlusion reduction type catalyst (30) includes a control unit (C1) comprising a.norrnal control operation feature (C10), a regeneration control initiation judging feature (C20), a catalyst activation control-operation feature (C30) and a rich-burn control operation feature (C40) capable of lowering the concentration of oxygen in the exhaust gas so as to realize such a constitution that the catalyst is carried out just before rich burning accompanied by EGR.

7 Claims, 11 Drawing Sheets

U.S. PATENT DOCUMENTS

| | | | |
|---|---|---|---|
| 6,269,634 B1 * | 8/2001 | Yokota et al. | 60/286 |
| 6,269,791 B1 * | 8/2001 | Tanaka et al. | 123/300 |
| 6,276,130 B1 * | 8/2001 | Ito et al. | 60/278 |
| 6,378,297 B1 * | 4/2002 | Ito et al. | 60/286 |
| 6,490,855 B1 * | 12/2002 | Bidner et al. | 60/274 |
| 6,553,757 B1 * | 4/2003 | Surnilla et al. | 60/285 |
| 6,679,050 B1 * | 1/2004 | Takahashi et al. | 60/285 |
| 6,718,756 B1 * | 4/2004 | Okada et al. | 60/286 |
| 6,751,948 B2 * | 6/2004 | Takemura et al. | 60/285 |
| 6,763,657 B2 * | 7/2004 | Wachi et al. | 60/285 |
| 6,868,827 B2 * | 3/2005 | Surnilla | 123/339.11 |

FOREIGN PATENT DOCUMENTS

| | | |
|---|---|---|
| JP | 11-303660 | 11/1999 |
| JP | 2000-130216 | 5/2000 |
| JP | 2001-55950 | 2/2001 |
| JP | 2001-115829 | 4/2001 |

OTHER PUBLICATIONS

Japanese Office Action dated Aug. 7, 2007 issued in connection with the corresponding Japanese Patent Application No. 2003-568231 (2 pages).

* cited by examiner (a)

(b)

(c)

(a)

70M : Monolithic honeycomb (b)

70S: Cell

74. Catalyst coat layer

71: Carrier (c)

72: Catalyst metal
73: NOx occluding substance

74. Catalyst coat layer

71: Carrier

EXHAUST GAS DECONTAMINATION SYSTEM AND METHOD OF EXHAUST GAS DECONTAMINATION

TECHNICAL FIELD

The present invention concerns an exhaust gas purifying system for purifying nitrogen oxides in an exhaust gas, provided with a nitrogen oxides occlusion reduction type catalyst in an internal combustion engine such as a diesel engine, and a method of exhaust gas purification.

BACKGROUND ART

Various studies and proposals have been made relating to a nitrogen oxides (NOx, hereinafter) catalyst for reducing and removing NOx in an exhaust gas of an internal combustion engine such as a diesel engine and certain gasoline engines or various combustion apparatus.

Among these NOx catalysts, a NOx occlusion reduction type catalyst containing NOx occluding substance is used or under consideration to be used for purifying an exhaust gas from a lean-burn gasoline engine or a diesel engine.

Unlike a three-way-catalyst, this NOx occlusion reduction type catalyst can purify NOx even if oxygen ($O_2$, hereinafter) exists in an exhaust gas. FIG. 9 shows the structure of the NOx occlusion reduction type catalyst 70, while FIG. 10 and FIG. 11 show the disposition of active metal on the support layer surface and the mechanism of occlusion, release and removal of NOx.

The NOx occlusion reduction type catalyst 70 shown in FIG. 9 is formed as a monolithic honeycomb 70M provided with a number of polygonal (quadrangular in FIG. 9) cells 70S on a catalyst support 71 of structural material made of codierite, stainless steel and the like.

And, as shown in FIG. 9(b) and FIG. 9(c), the inner wall of the cell 70S presenting a large surface area as a whole is coated with a catalyst coat layer (support layer) 74 formed with a porous coating material such as zeolite or alumina ($Al_2O_3$) and silica in order to increase the surface area. And, as shown in FIG. 10 and FIG. 11, a catalyst metal 72 and a NOx occluding substance (R) 73 are supported by the catalyst coat layer 74.

This catalyst metal 72 is formed with a precious metal such as platinum (Pt) having an oxidation function, while the NOx occluding substance (R) 33 is formed with one or several of alkali metals such as potassium (K), alkaline-earth metals such as barium (Ba, hereinafter) or rare-earth such as lanthanum (La) having NOx occlusion and release function.

FIG. 10 shows the mechanism of purification by NOx occlusion with the NOx occlusion reduction type catalyst 70, under an exhaust gas condition where $O_2$ is contained in the exhaust gas such as the exhaust condition in normal operation of a diesel engine, a lean-burn gasoline engine or the likes.

Under this exhaust gas condition, a nitrogen monoxide (NO, hereinafter) in the exhaust gas reacts with $O_2$ in the exhaust gas to be oxidized and turns into nitrogen dioxide ($NO_2$, hereinafter) by the catalysis of the catalyst metal 72. Then, the NOx occluding substance (R) 73 such as Ba occludes the $NO_2$ in a form of nitrate (for instance, $Ba(NO_3)_2$) and consequently the NOx in the exhaust gas is purified.

However, if the condition continues, as the NOx occluding substance (R) 73 having a NOx occlusion function is totally transformed into nitrate losing the NOx occlusion function, the engine operation condition is changed to generate a rich state exhaust gas (exhaust gas of a rich air/fuel ratio) without $O_2$ and with a high carbon monoxide (CO, hereinafter) concentration and a high exhaust temperature, then the exhaust gas is sent to the NOx occlusion reduction type catalyst.

Then, as shown in FIG. 11, when $O_2$ becomes absent in the exhaust gas and the CO concentration and the exhaust temperature rise, the NOx occluding substance (R) 73 that has occluded NOx releases $NO_2$, as the nitrite returns into the original form such as Ba. And, since $O_2$ is absent in the exhaust gas, the released $NO_2$ is reduced to water, ($H_2O$, hereinafter), carbon dioxide ($CO_2$, hereinafter) and nitrogen ($N_2$, hereinafter) and purified, reacting with a CO, a hydrocarbon (HC, hereinafter), a hydrogen ($H_2$, hereinafter) and so on in the exhaust gas as the reducer by the catalysis of the catalyst metal 72.

In a part of these exhaust gas purifying systems of the conventional art provided with the NOx occlusion reduction type catalyst 70, it has been proposed to reduce $O_2$ concentration and increase CO concentration in the exhaust gas with a small quantity of fuel injection, by decreasing the intake quantity through a large quantity of EGR (exhaust gas recirculation), as the exhaust gas purifying system described in the Laid-Open Japanese Patent Publication 2000-356127, in order to avoid the deterioration in fuel efficiency caused by the generation of rich state exhaust gas. In this exhaust gas purifying system, the rich burn is realized with a small quantity of fuel injection, and the deterioration in fuel efficiency is avoided, by performing EGR.

However, in the exhaust gas purifying system of the Laid-Open Japanese Patent Publication 2000-356127, if $O_2$ concentration in the exhaust gas is decreased by a large quantity of EGR, such problems occur that neither the combustion temperature in the engine cylinder nor the temperature of the exhaust gas rises and that inert gases such as $CO_2$ increase on the catalyst surface.

Therefore, another problem of deterioration in the NOx purifying performance appears, that is because the catalyst surface temperature does not rise during the rich-burn accompanied by the EGR leaving the catalyst unactivated and the generated $NO_2$ is released without being removed, although it is necessary to heat the catalyst surface to a high temperature since a large amount of energy is required to reduce $NO_2$ released from the NOx occluding substance to $N_2$.

FIG. 12 shows the NOx purifying performance of a NOx occlusion reduction type catalyst in an exhaust gas purifying system generating an exhaust gas which is in a rich-burn state by using a conventional EGR. According to the FIG. 12, it can be understood that a peak of high NOx concentration appears at the beginning of the regeneration where a rich-burn operation for regenerating a NOx occlusion reduction type catalyst starts by the rich-burn (rich state) accompanied by EGR and that the NOx removal efficiency significantly lowers.

The present invention is devised to solve the aforementioned problems and the object is to provide an exhaust gas purifying system and a method of an exhaust gas purification capable of removing sufficiently NOx released from a NOx occlusion reduction type catalyst and achieving a high NOx removal efficiency, even in a rich-burn accompanied by EGR by executing a catalyst activation control operation to heat up the catalyst surface immediately before the rich-burn accompanied by EGR starts when regenerating a NOx occlusion reduction type catalyst.

DISCLOSURE OF THE INVENTION

The exhaust gas purifying system for achieving the aforementioned object is composed as follows.

1) An exhaust gas purifying system provided with a NOx occlusion reduction type catalyst having a catalyst metal and a NOx occluding substance in an exhaust passage of an engine and a control unit comprising a normal control operation means, a regeneration control initiation judging means for detecting a regeneration control initiation timing for said NOx occlusion reduction type catalyst, and a rich-burn control operation means capable of lowering the concentration of oxygen in the exhaust gas; wherein said rich-burn control operation means executes the rich-burn control operation for generating an exhaust gas which is in a fuel-rich state by recirculating EGR gas and said control unit comprises a catalyst activation control operation means for executing a control operation for activating said catalyst metal immediately before performing said rich-burn control operation.

The catalyst metal can be formed with those having an oxidation reduction catalytic function such as platinum, while the NOx occluding substance can be formed with any one or combination of alkali metals such as potassium (K), sodium (Na), lithium (L), cesium (Cs), alkaline-earth metals such as barium (Ba), calcium (Ca), and rare earths such as lanthanum (La), yttrium (Y).

Besides, the operation where the air/fuel ratio state in the exhaust gas becomes rich is not necessarily a rich-burn in the cylinder bore, but it may be a operation where the air/fuel ratio in the exhaust gas flowing in the NOx occlusion reduction type catalyst becomes the state of rich, near the theoretical air/fuel ratio or where the fuel quantity exceeds the theoretical air/fuel ratio.

According to this composition, it is possible to cut down the fuel consumption during a rich-burn, as EGR gas is recirculated when the rich-burn is executed for regenerating a NOx occlusion reduction type catalyst and, moreover, the NOx released from the NOx occluding substance is removed sufficiently, because the control for activating the catalyst metal is performed immediately before the rich-burn accompanied by EGR, and the rich-burn is performed immediately after the catalyst is activated.

2) Then, the aforementioned exhaust gas purifying system, wherein said catalyst activation control operation means performs a burning control operation in the nearly stoichiometric air/fuel ratio and performs a multi-stage injection and an early injection in a fuel injection into the cylinder.

For the burning in the nearly stoichiometric air/fuel ratio, the excess air factor $\lambda$ is in a range of 0.8 to 1.1, preferably $\lambda=1.01$. Whereby, the catalyst surface temperature rises efficiently, as the exhaust gas temperature can be elevated with less quantity of fuel. In the burning in the nearly stoichiometric air/fuel ratio, no EGR is performed with the EGR valve totally closed in order to raise the exhaust gas temperature as high as possible. In addition, the multi-stage injection and the early injection accelerate the mixing of fuel and gas in the cylinder, permitting a smokeless burning to be realized.

3) The aforementioned exhaust gas purifying system, wherein said NOx occlusion reduction type catalyst comprises a reducer occluding substance.

The reducer occluding substance can be composed with a substance such as a zeolite or the likes that occludes HC and CO at a low temperature and releasing at a high temperature. And providing with this reducer occluding substance, the reducer occluding substance purifies the exhaust gas by occluding HC and CO in the exhaust gas during a normal operation, and moreover, during a regeneration control operation of a NOx occlusion reduction type catalyst, occluded HC and CO are released to be the reducer of the NOx released at the same time and the NOx can be reduced.

4) The aforementioned exhaust gas purifying system, wherein said catalyst activation control operation means performs a burning control operation in the nearly stoichiometric air/fuel ratio and controls the torque generated by the engine by controlling the intake air into engine. By the intake control to adjust the opening of the throttle butterfly, the generation torque is adjusted and controlled, therefore the torque variation during the transition from the normal control operation to the catalyst activation control operation can be reduced.

5) The aforementioned exhaust gas purifying system, wherein said rich-burn control operation means recirculates EGR gas for generating an exhaust gas which is in a rich-fuel state and controls the torque generated by the engine by controlling the intake air into engine. Since the engine torque by controlling the intake control adjusting the opening of the throttle butterfly, the torque variation during the transition from the catalyst activation control operation to the rich-burn control operation or from the rich-burn control operation to the normal control operation can be reduced.

Then, the method of exhaust gas purification in the aforementioned exhaust gas purifying system is composed as follows and can provide functional effects similar to those mentioned above.

1) A method of exhaust gas purification is
a method to be carried with use of an exhaust gas purifying system provided with a NOx occlusion reduction type catalyst having a catalyst metal and a NOx occluding substance in an exhaust passage of an engine and a control unit comprising a normal control operation means, a regeneration control initiation judging means for detecting a regeneration control initiation timing for said NOx occlusion reduction type catalyst, a catalyst activation control operation means and a rich-burn control operation means capable of lowering the concentration of oxygen in the exhaust,
which comprises performing a catalyst activation control operation by said catalyst activation control operation means when it is judged by said regeneration control initiation judging means that a regeneration control for the regeneration of the NOx occlusion reduction type catalyst is to be initiated and thereafter executing a rich-burn control operation accompanying a recirculation of EGR gas by said rich-burn control operation means to thereby regenerate said NOx occlusion reduction type catalyst.

2) The aforementioned method of exhaust gas purification, which comprises performing a burning control operation in the nearly stoichiometric air/fuel ratio and performing the fuel injection into the cylinder through a multi-stage injection and an early injection, by said catalyst activation control operation.

3) The aforementioned method of exhaust gas purification, wherein said NOx occlusion reduction type catalyst comprises a reducer occluding substance.

4) The aforementioned method of exhaust gas purification, which comprises performing said catalyst activation control operation to control the torque generated by the engine by controlling the intake air into engine, while performing a burning control operation in the nearly stoichiometric air/fuel ratio.

5) The aforementioned method of exhaust gas purification, which comprises performing said rich-burn control operation to recirculate EGR gas to generate an exhaust gas which is in a fuel-rich state and to control the torque generated by the engine by controlling the intake air into engine.

Then, according to the exhaust gas purifying system provided with the NOx occlusion reduction type catalyst and the method of exhaust gas purification of the present invention, since a rich burning accompanied by EGR is performed after the NOx occlusion reduction type catalyst has heated up to a high temperature to be activated preliminarily by a catalyst activation control operation such as a burning in the nearly stoichiometric air/fuel ratio, before regenerating the NOx occlusion reduction type catalyst, it is possible to prevent the surface temperature of the NOx occlusion reduction type catalyst from being lowered by the rich-burn accompanied by EGR and the catalyst activity from being deteriorated by the surface temperature fall.

Consequently, a NOx can be reduced sufficiently, even if a rich-burn accompanied by EGR is performed under a regeneration control operation, and the NOx purifying performance can be improved, curbing a deterioration in fuel efficiency by a regeneration control.

BEST CONFORMATION FOR EMBODIMENT OF THE INVENTION

Figure 1:
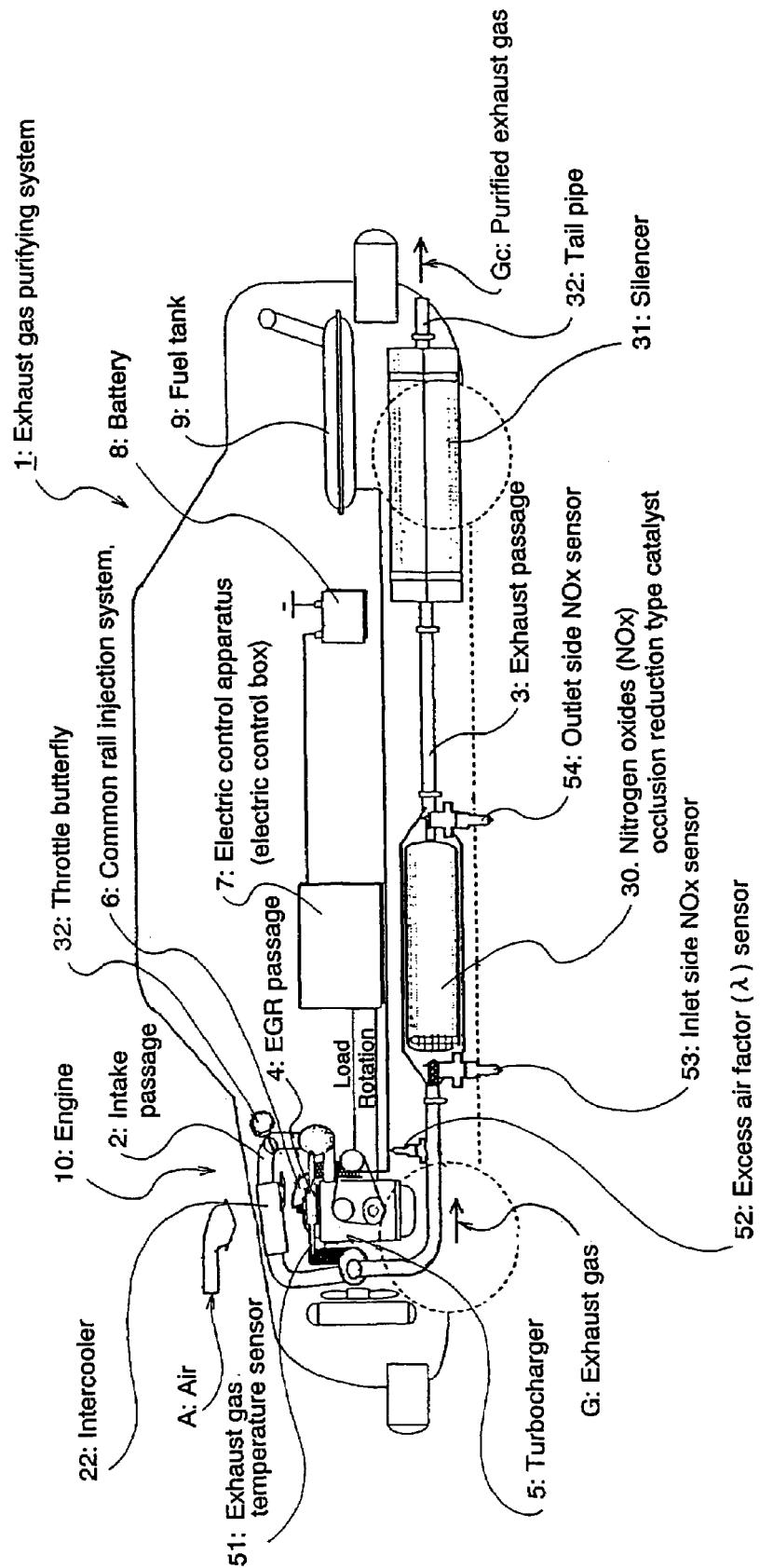
FIG. 1 shows the diagram of an exhaust gas purifying system embodied according to the present invention.

Now, the exhaust gas purifying system provided with the NOx occlusion reduction type catalyst and the method of exhaust gas purification according to the present invention shall be described referring to the drawings.

Figure 2:
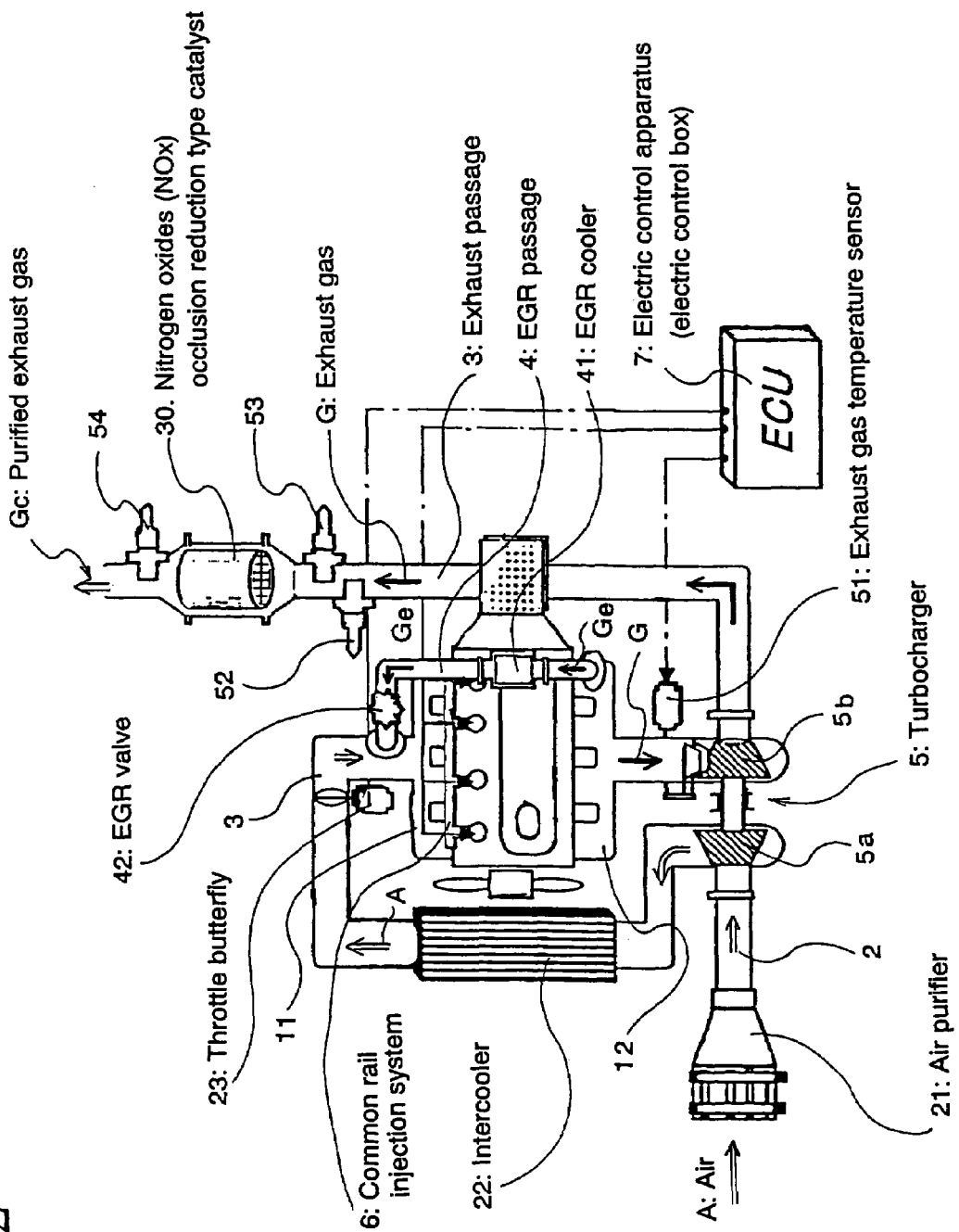
FIG. 2 shows the diagram of the engine system part of the exhaust gas purifying system of FIG. 1.

First, the exhaust gas purifying system 1 provided with the NOx occlusion reduction type catalyst 30 according to the present invention shall be described, referring to FIG. 1 and FIG. 2.

FIG. 1 shows the composition diagram of an engine 2 and an engine exhaust system of an exhaust gas purifying system 1 provided with a NOx occlusion reduction type catalyst 30 by an example of a diesel engine, while FIG. 2 shows the detail of the engine system part of FIG. 1.

As shown in FIG. 1 and FIG. 2, in the exhaust gas purifying system 1, an air purifier 21, a compressor 5a of a turbocharger 5, an intercooler 22 and a throttle butterfly (intake throttling valve) 23 are arranged from the upstream side in an intake passage 2 of an engine 10, while an exhaust gas temperature sensor 51, a turbine 5b of a turbocharger 5, an excess air factor (λ) sensor 52, an inlet side NOx sensor 53, a NOx occlusion reduction type catalyst 30, an exit side NOx sensor 54 and a silencer 31 (FIG. 1) are arranged from the upstream side in an exhaust passage 3. Furthermore, an EGR passage 4 provided with an EGR cooler 41 and an EGR valve 42 is connected from an exhaust manifold 12 to the intake passage 2 on the downstream side of the throttle butterfly 23.

Then, a common-rail injection system 6 for a fuel injection of the engine 10 and an electronic control apparatus (electronic control box) 7 for controlling the whole engine called ECU (engine control unit) are installed.

Besides, any of a variable capacity type turbo (VGS), a turbo with waist gate or an ordinary turbo may be used as the turbocharger 5, in case of using the variable capacity type turbo (VGS) or the turbo with waist gate, the variable nozzle and the waist gate are also controlled by the electronic control apparatus 7.

In the exhaust gas purifying system 1, an air A passes through the air purifier 21 to be supercharged by the compressor 5a of the turbocharger 5 and then to be cooled by the intercooler 22, subsequently passes through the throttle butterfly 23 to be supplied in the cylinder from the intake manifold 11 of the engine 10. The flow of the intake is adjusted by the throttle butterfly 23 which is controlled by the electronic control apparatus 7.

On the other hand, an exhaust gas G gets out of the exhaust manifold 12 to drive the turbine 5b of the turbocharger 5, subsequently passes through the NOx occlusion reduction type catalyst 30 to be a purified exhaust gas Gc, and it is discharged from a tail pipe 32 (FIG. 1) after passing through the silencer 31 (FIG. 1).

Meanwhile, an EGR gas Ge, which is a part of the exhaust gas G, passes through the EGR valve 42 after being cooled by the EGR cooler 41 and enters the intake passage 2 to circulate again. For the EGR gas Ge, ON/OFF and gas flow adjustment are performed by the EGR valve 42.

Now, the NOx occlusion reduction type catalyst 30 shall be described.

Figure 3:
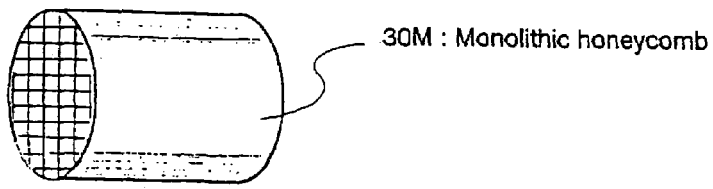
FIG. 3 shows the construction drawing of a NOx occlusion reduction type catalyst embodied according to the present invention, showing (a) the monolithic honeycomb structure, (b) the cell structure, and (c) the catalyst support structure respectively.
Figure 3:
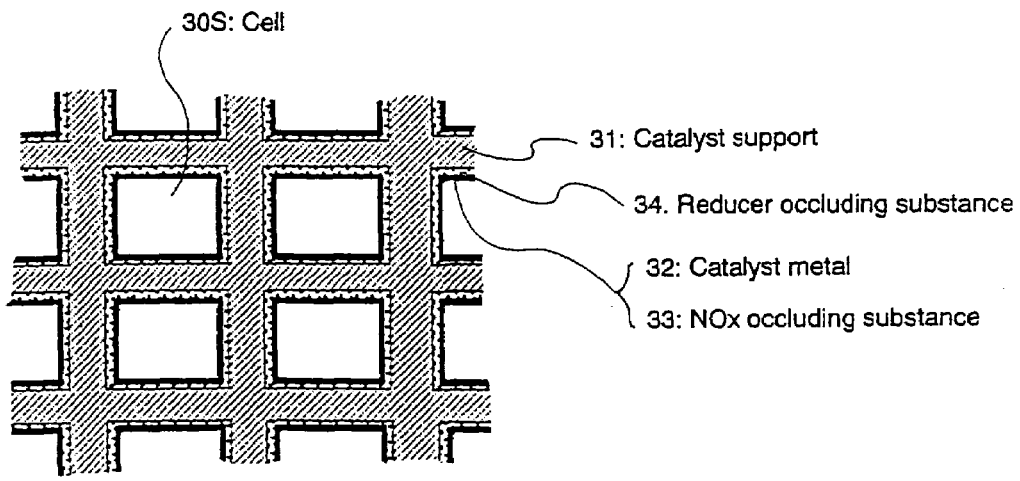
Figure 3:
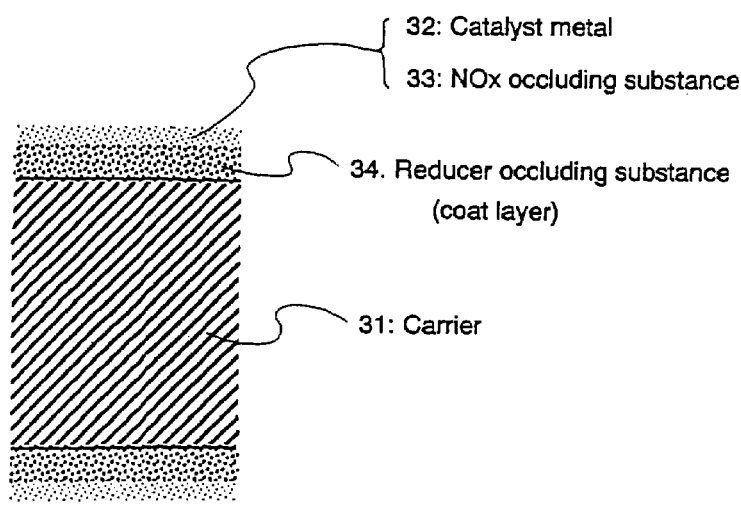

FIG. 3 shows the wall surface structure of the NOx occlusion reduction type catalyst 30. This NOx occlusion reduction type catalyst 30 is formed with a monolithic honeycomb 30M composed of a support body 31 such as a γ alumina, and the surface inside of cells 30S of the monolithic honeycomb 30M is coated with a reducer occluding substance 34 which is formed with zeolite or the likes, and a catalytic metal 32 and a NOx occluding substance 33 are supported on the surface.

The catalytic metal 32 is formed with platinum (Pt) or others having oxidation activity in a temperature range higher than the activity initiation temperature. The activity initiation temperature of platinum is about from 150° C. to 200° C.

Besides, the NOx occluding substance 33 is formed with alkali metals such as potassium (K), sodium (Na), lithium (L), cesium (Cs), alkaline-earth metals such as barium (Ba), calcium (Ca) and rare earth such as lanthanum (La), yttrium (Y), and occludes NOx when the $O_2$ concentration in the gas is high, and releases NOx when the $O_2$ concentration in the gas is low.

Figure 4:
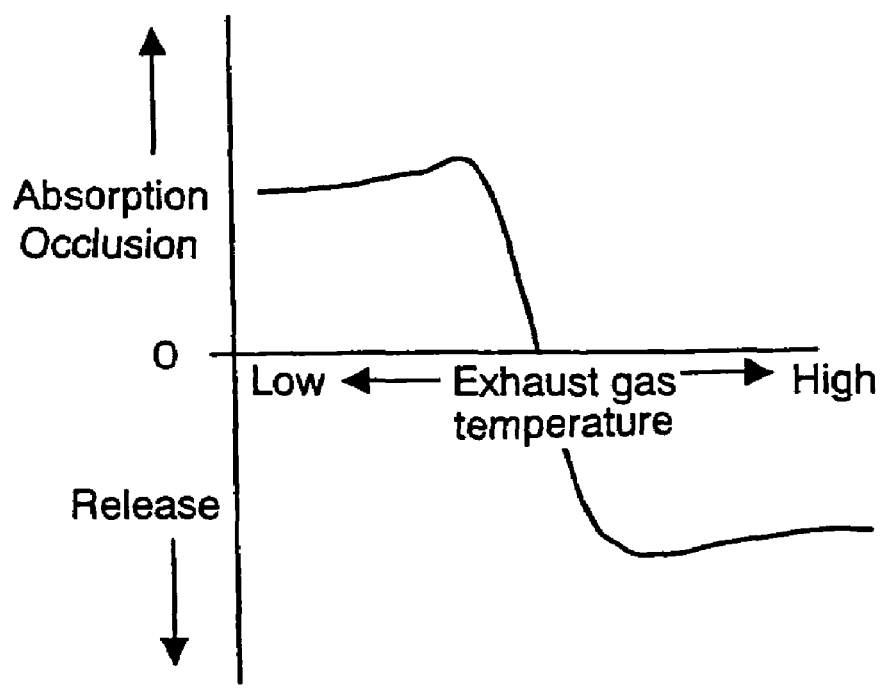
FIG. 4 shows temperature characteristics of absorption of HC and CO, and occluding substance (reducer occluding substance) according to the present invention.

And, the reducer occluding substance 34 formed with zeolite or others absorbs or occludes reducers such as HC or CO at a low temperature, and releases at a high temperature. FIG. 4 shows the relation (temperature characteristics) of absorption, occlusion and release of HC or CO in respect to the catalyst temperature of the reducer occluding substance 34.

Next, a method of exhaust gas purification in the exhaust gas purifying system 1 and the purification mechanism of a NOx in the exhaust gas shall be described, referring to FIG. 5 to FIG. 8.

Figure 5:
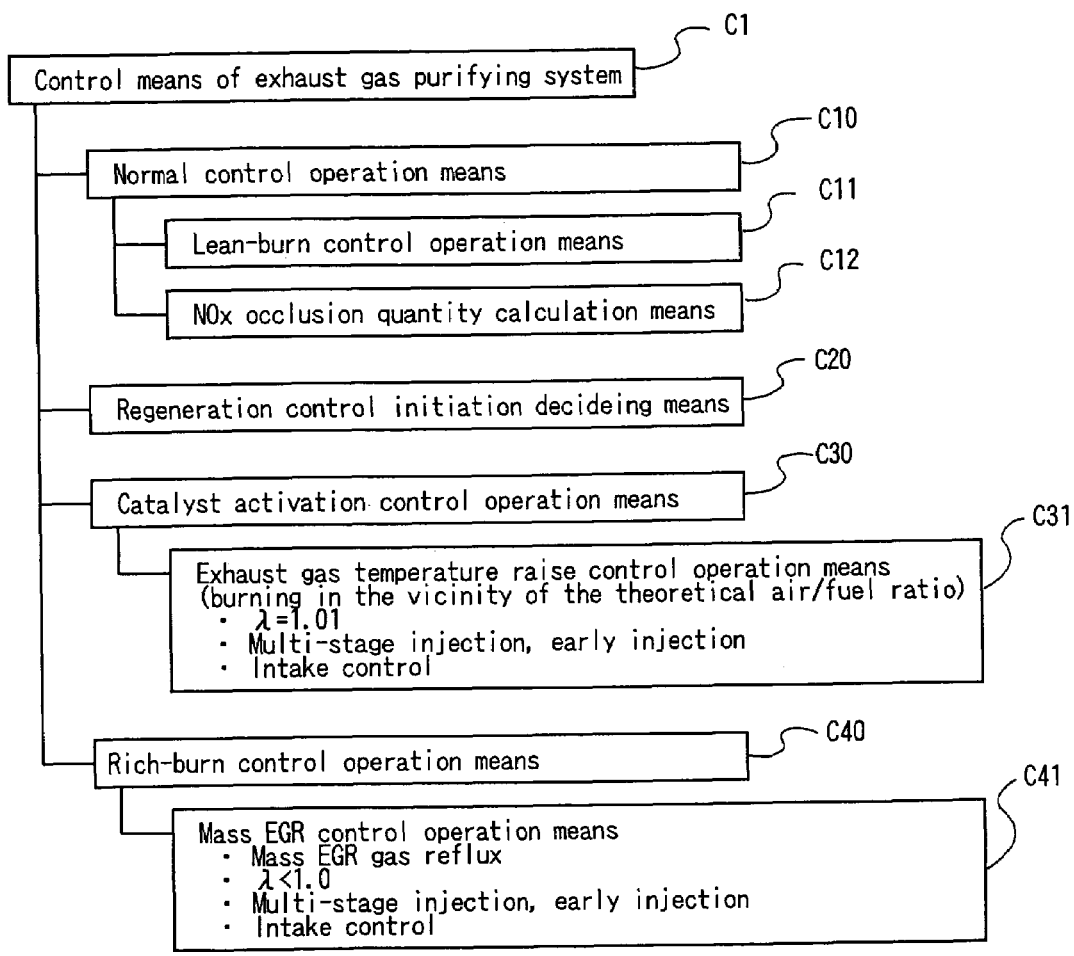
FIG. 5 shows the composition of the control means of the exhaust gas purifying system embodied according to the present invention.

The method of the exhaust gas purification is performed by the exhaust gas purifying system 1 wherein the control means of the exhaust gas purifying system 1 comprises every means as shown in FIG. 5.

The control means is composed of a normal control operation means C10, a regeneration control initiation judging means C20, a catalyst activation control operation means C30 and a rich-burn control operation means C40.

The normal control operation means C10 is a control means for performing a normal lean-burn operation, and the regeneration control initiation judging means C20 is for judging whether the NOx occluding capacity of the NOx occlusion reduction type catalyst 30 has saturated or not.

The catalyst activation control operation means C30 is for raising the catalyst surface temperature in order to increase the catalyst activity, and in the embodiment, it is composed of an exhaust temperature raising control operation means C31 for executing a burning control operation in the nearly stoichiometric air/fuel ratio where the air excess factor $\lambda$ is from 0.8 to 1.1, preferably $\lambda = 1.01$.

Also, the rich-burn control operation means C40 is composed of a large quantity EGR regeneration control means C41 and the large quantity EGR regeneration control means C41 is a means to release NOx from the NOx occluding substance 30 by generating an exhaust gas near zero of $O_2$ concentration and to reduce the released NOx at the same time.

Figure 6:
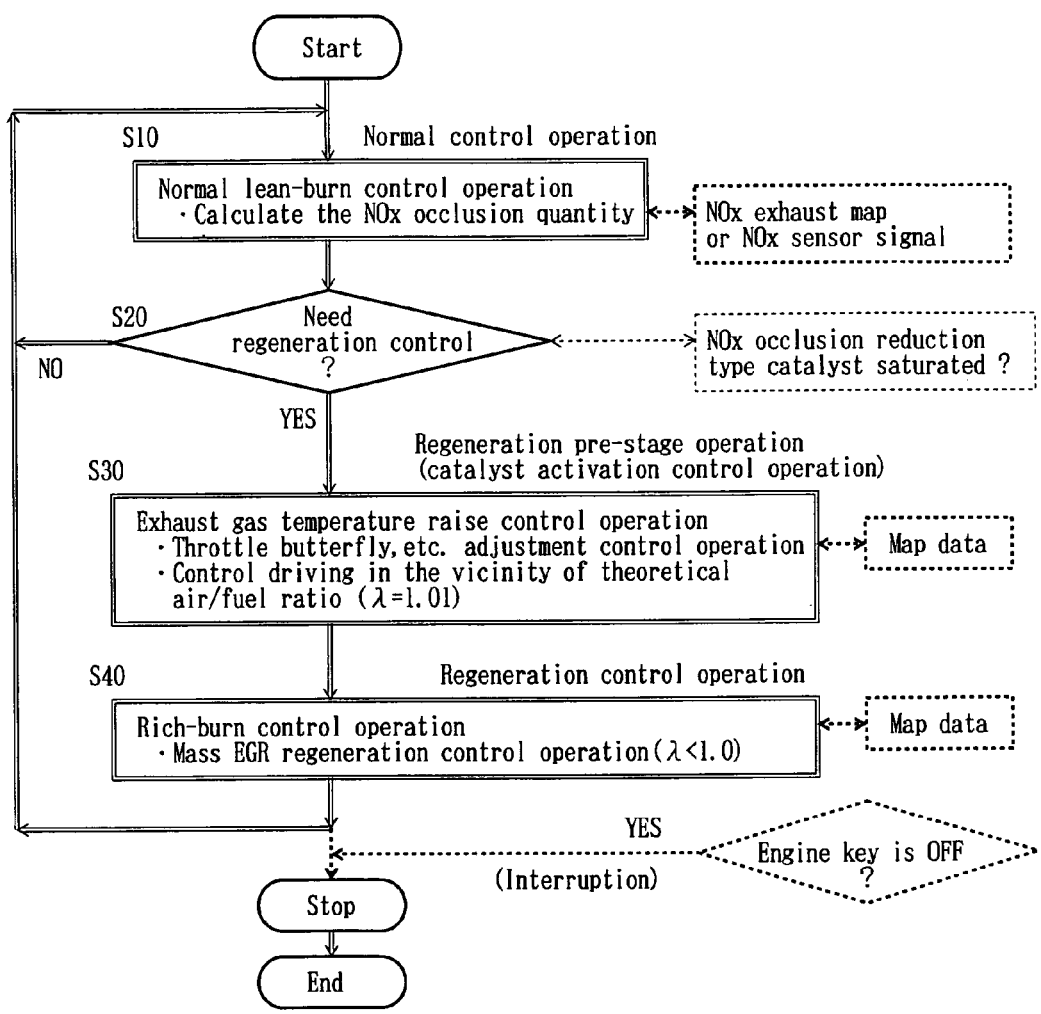
FIG. 6 is a flow chart of a regeneration control flow showing the method of exhaust gas purification embodied according to the present invention.
Figure 7:
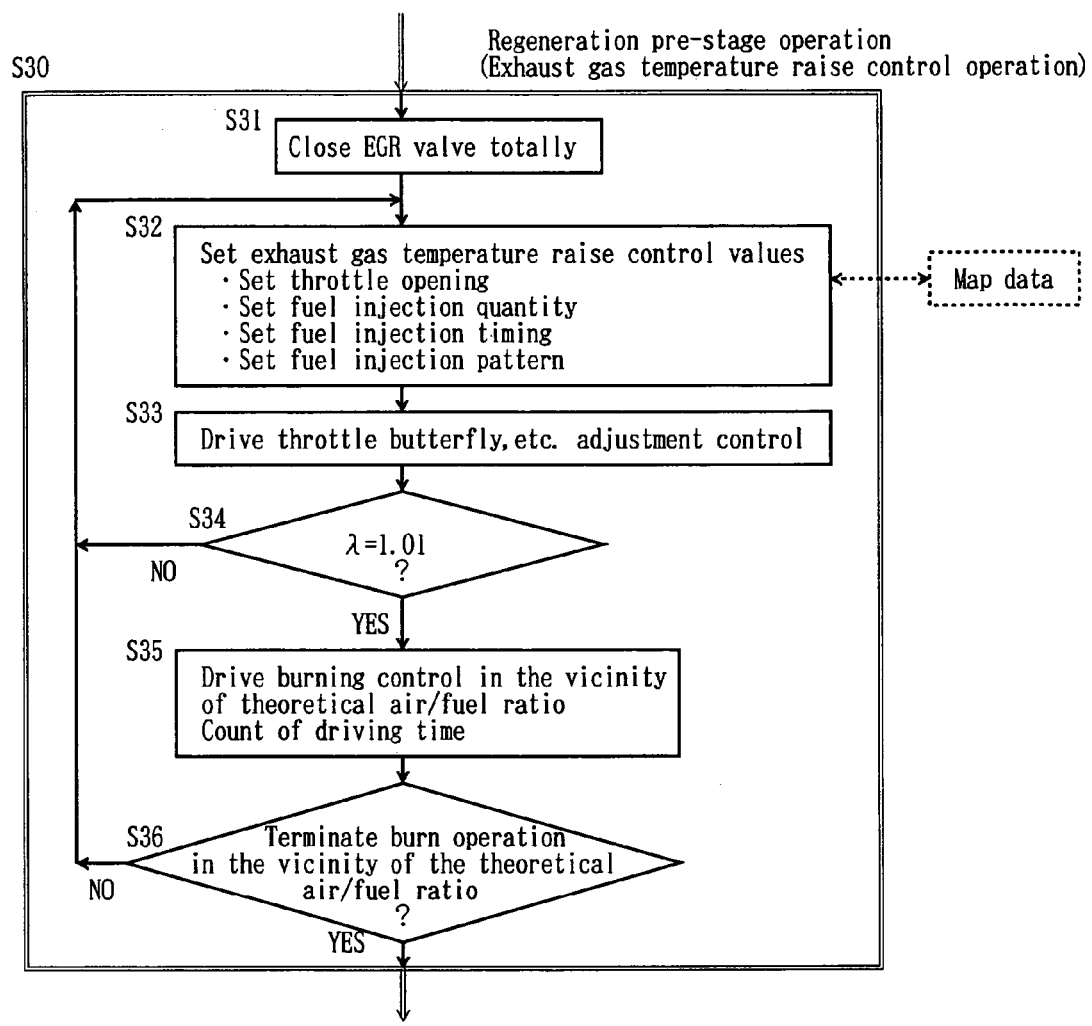
FIG. 7 is a more detailed flow chart of the preliminary regeneration operation of FIG. 6.
Figure 8:
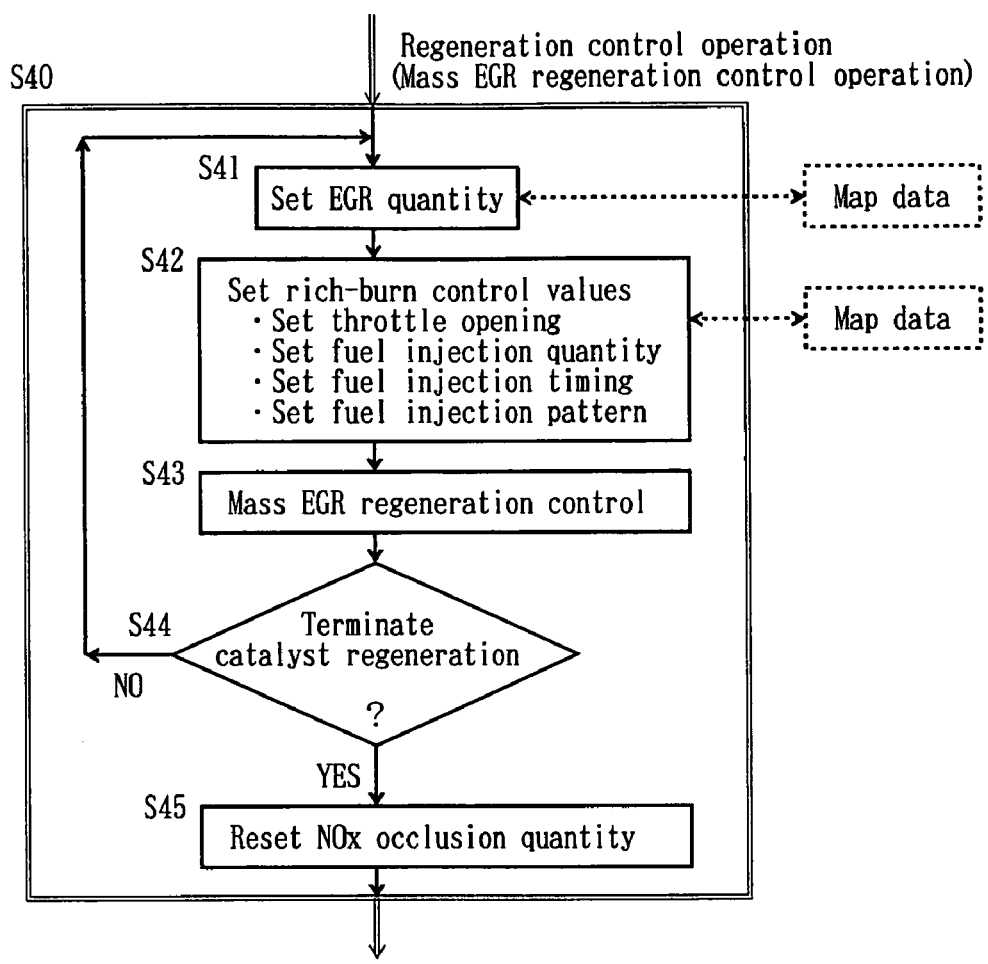
FIG. 8 is a more detailed flow chart of the regeneration control operation of FIG. 6.
Figure 9:
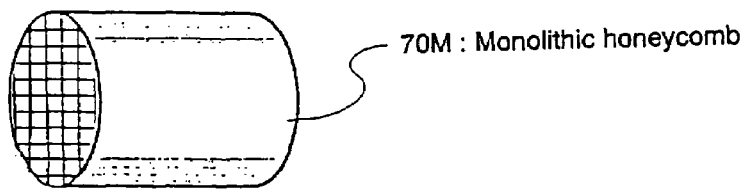
FIG. 9 shows a structure of a NOx occlusion reduction type catalyst of a conventional art, (a) shows the monolithic honeycomb structure, (b) shows the cell structure, and (c) shows the catalyst support structure.
Figure 9:
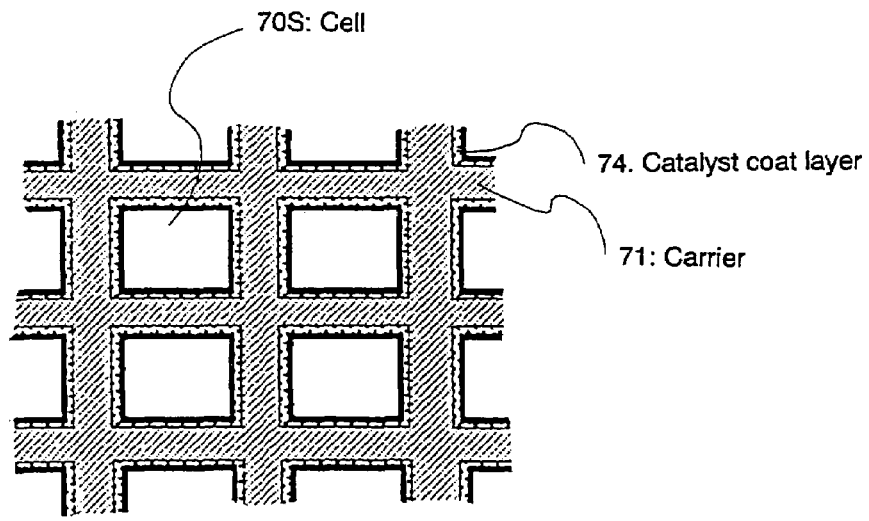
Figure 9:
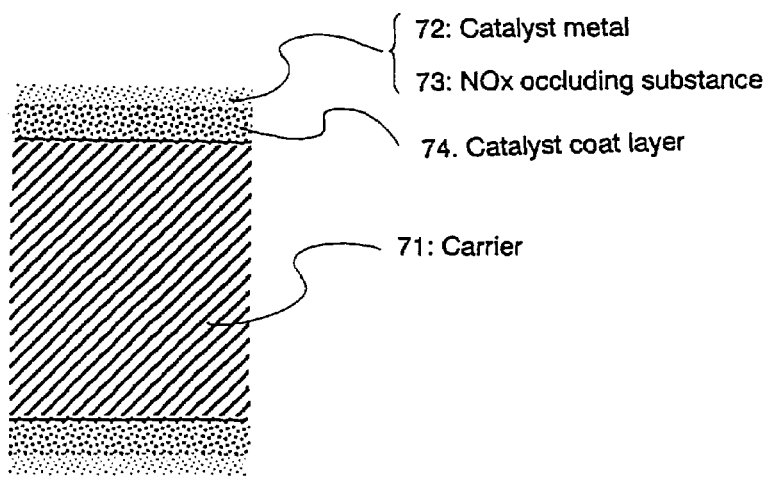
Figure 10:
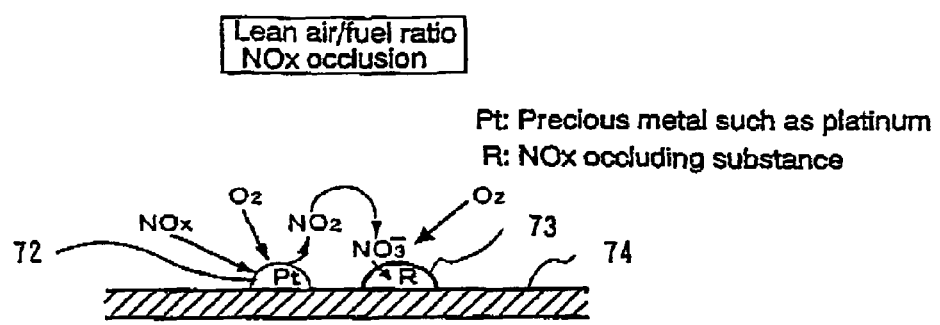
FIG. 10 is a pattern diagram in case of a lean-burn gas showing the mechanism of NOx purification in the NOx occlusion reduction type catalyst in a conventional art.
Figure 11:
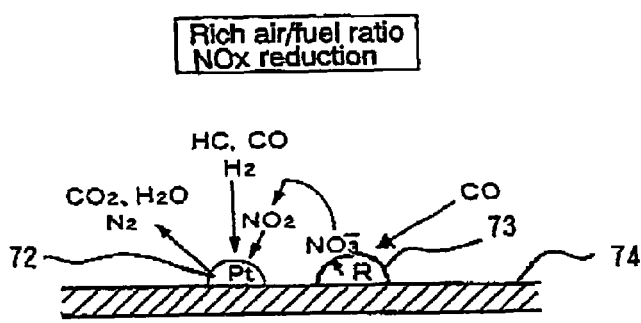
FIG. 11 is a pattern diagram in case of an exhaust gas of rich air/fuel ratio showing the mechanism of NOx purification in the NOx occlusion reduction type catalyst in a conventional art.
Figure 12:
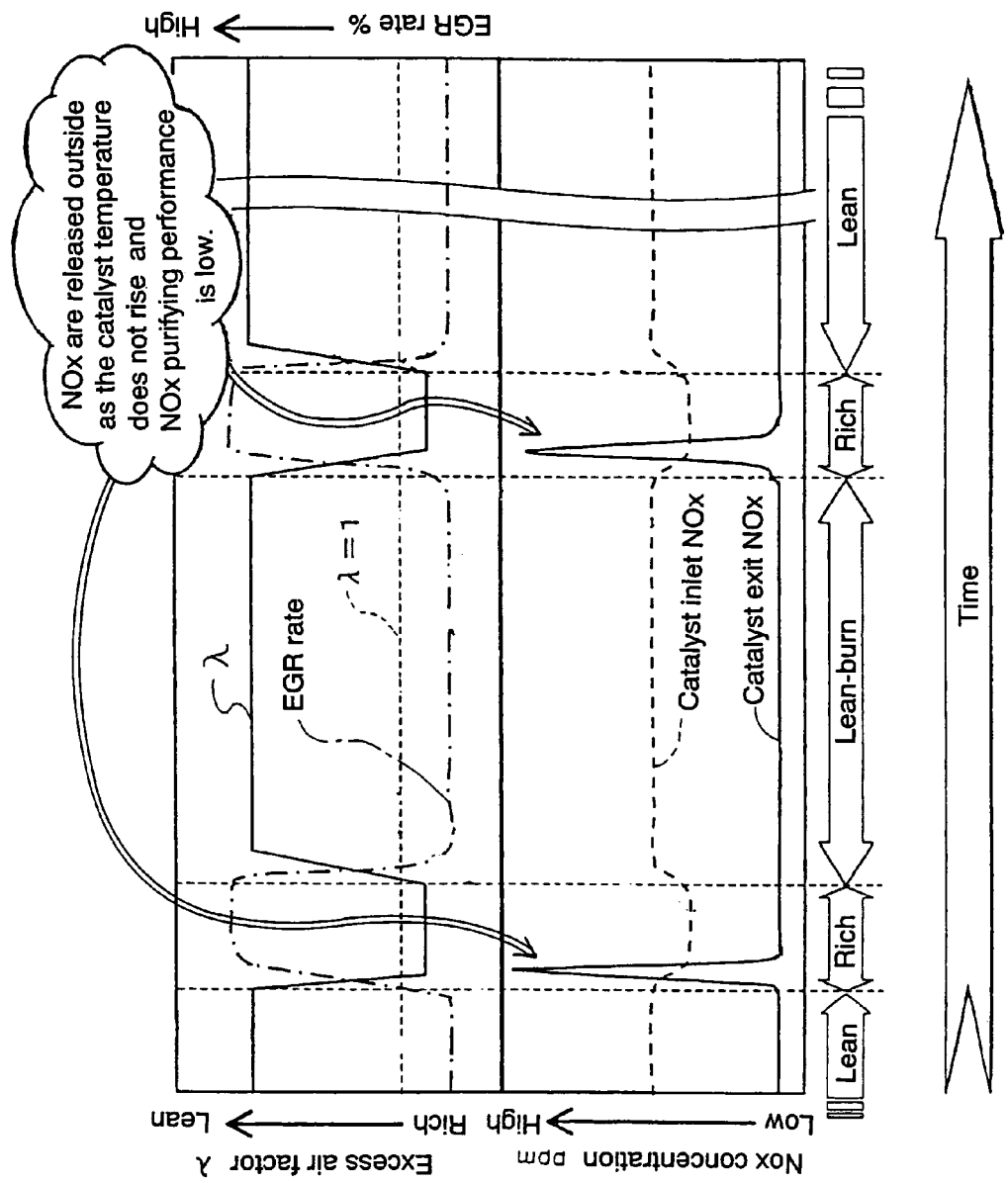
FIG. 12 is a time series diagram showing the state of exhaust gas in case of using the exhaust gas purifying system and the exhaust gas purification method according to the related art.

And, the method of exhaust gas purification is executed according to the regeneration control flow of the NOx occlusion reduction type catalyst as illustrated in FIG. 6 to FIG. 8, and in the step S10, a normal lean-burn operation is executed by the normal control operation means C10, and when the regeneration control operation for regenerating the NOx occlusion reduction type catalyst 30 is judged to be necessary by the regeneration control initiation judging means C20 in the step S20, the catalyst surface temperature is raised by executing the catalyst activation control operation by the catalyst activation control operation means C30 in the step S30. Thereafter, in the step S40, the regeneration control operation is carried out to make the air/fuel ratio state in the exhaust gas a rich state by reducing oxygen in the exhaust gas, all the way circulating a large quantity of EGR by the rich-burn control means C40, and the regeneration operation is terminated after having continued for a predetermined period of time.

Then, the step is returned to the step S10 to perform the normal control operation, and when the NOx occluding capacity of the NOx occlusion reduction type catalyst 30 approaches the saturation, the regeneration operation is repeated.

The regeneration control flow of the FIG. 6 is schematically shown assuming that it is executed in parallel with other control flows of the engine during the operation of the engine 10, so if the engine key is turned OFF and the engine operation is stopped, an interruption occurs in the course of the execution of the regeneration control flow and the execution is suspended and then terminated. The parts of the suspension and the termination of the regeneration control flow by the engine key OFF are illustrated by dotted lines.

Hereinafter, the control flow shown in FIG. 6 and FIG. 7 is further described in detail.

If the control flow starts, in the step S10, the normal control operation is executed for a predetermined period of time related to the time interval of control by the normal control operation means C10, then proceeding to the step S20, it is judged if the regeneration control is necessary or not. In case when the regeneration control is judged to be unnecessary in the step S20, the step is returned to the step S10 to repeat the normal control operation of the step S10 until the regeneration control is judged to be necessary.

In the normal control operation of the step S10, the lean-burn operation is performed by the lean-burn control operation means C11 of the normal control operation means C10 but, at the same time, the NOx occlusion quantity occluded by the NOx occlusion reduction type catalyst 30 is calculated by the NOx occlusion quantity calculating means C12.

In the lean-burn operation, the intake control is not executed with the throttle butterfly fully opened, and the EGR is controlled normally and the fuel injection control is also operated by the normal injection control. The engine output is controlled by adjusting the fuel flow, together with the exhaust control and the fuel efficiency control.

In addition, the normal control operation is a lean-burn operation exhausting the exhaust gas of a normal lean air/fuel ratio (lean-burn operation for gasoline engine, normal burning operation for diesel engine) and the exhaust gas component and the exhaust gas temperature are as same as those of the exhaust gas in a normal diesel engine.

Consequently, since the $O_2$ concentration in the exhaust gas is high, NOx in the exhaust gas is absorbed and occluded by the NOx occluding substance 33. In addition, since the exhaust gas temperature and the catalyst temperature are low, HC and CO are either absorbed and occluded by the reducer occluding substance 34 or oxidized with $O_2$ in the exhaust gas by the catalysis of the metal catalyst 32, therefore the exhaust gas is purified.

Besides, the relation between the engine operation state and the NOx exhaust quantity is expressed in a form of map data by the preliminary measurement results and the like, a calculation of the NOx occlusion quantity is executed by the NOx exhaust map previously stored in the control unit. Otherwise, from the measurement values of an inlet NOx sensor 53 and an exit NOx sensor 54 installed in front and rear of the NOx occlusion reduction type catalyst 30, the NOx occlusion quantity may be calculated or it may be evaluated if the NOx occlusion capacity approaches the saturation.

In the step S20, if it is judged to start the regeneration control operation when the NOx occlusion quantity has reached the pre-set NOx occlusion limit value where the NOx occlusion quantity gets saturated, the regeneration control operation of the step S40 is executed after performing the preliminary regeneration operation of the step S30.

In the preliminary regeneration operation of the step S30, as shown in FIG. 7, the EGR is stopped with the EGR valve 42 fully closed in the step S31 to raise the combustion temperature in the cylinder and, at the same time, the exhaust temperature raising control values such as a throttle opening, a fuel injection quantity, a fuel injection timing and a fuel injection pattern are set so that the air excess factor $\lambda$ to be 0.8 to 1.1, preferably to be the objective value of 1.01, referring to the map date and performing the feedback of the output value from the $\lambda$ sensor 52 in the step S32. And in the step S33, the burning control in the nearly stoichiometric air/fuel ratio is performed based the set values. Then, when the air excess factor λ becomes the objective value, the burning control in the nearly stoichiometric air/fuel ratio of the step S35 starts. This control is repeated until it is judged to terminate the burning in the vicinity of the theoretical air/fuel ratio in the step S36. In the flow shown in FIG. 7, though the burning in the nearly stoichiometric air/fuel ratio is judged to terminate when a predetermined period of time has judged to be passed by counting the operation time in the step S35, without being limited to this, such a control as to terminate when the exhaust temperature becomes equal or superior to a predetermined temperature by checking the exhaust temperature or otherwise may be also executed.

On the other hand, a control operation for adjusting the throttle butterfly 23 and a fuel injection are executed. In other words, the throttle butterfly 23 is throttled and the throttling angle is controlled so that λ becomes the objective value (1.01). Whereby, the catalyst surface temperature is raised and the catalyst is activated by the burning control in the nearly stoichiometric air/fuel ratio.

In the operation, the air quantity and the fuel injection quantity are controlled so that the same torque as large as that in the time of lean-burn is generated by the "acceleration & torque map" which is preset by test results and the likes. Besides, the fuel injection is performed by the multi-injection and, what is more, the early injection (advanced up to the premix combustion). Smokeless burning is realized, as the mixing of a fuel and a gas in the cylinder is accelerated by this injection pattern. However, the quantity of HC and CO increases.

In the operation where the output is controlled by this oxygen concentration, the torque is controlled by the throttle butterfly 23 and the combustion is controlled in the same way as the gasoline engine, therefore the exhaust gas temperature becomes high.

Then, when a hot exhaust gas of a rich air/fuel ratio around λ=1.01 flows in the NOx occlusion reduction type catalyst 30, the catalyst surface is heated to raise the temperature. And at the same time, the CO and HC increased in the exhaust gas are oxidized by $O_2$ remaining in the exhaust gas through catalysis of the NOx occlusion reduction type catalyst 30 to generate heat. The catalyst surface temperature is raised further by the generated heat, and CO and HC are released from the reducer occluding substance 34 on the surface of the NOx occlusion reduction type catalyst 30, causing further oxidation reaction and generating reaction heat. Thereby, the catalyst temperature rises rapidly and the NOx occlusion reduction type catalyst 30 is heated to high temperature.

[Rich-burn control operation]

In the step S36, the judgment whether to terminate or not the burning in the nearly stoichiometric air/fuel ratio is made, referring to the "map of engine speed and burning time in the nearly stoichiometric air/fuel ratio". And after the judgment to terminate it is made, the regeneration control operation of the step S40 as shown in FIG. 8 is executed.

In the regeneration control operation, the operations to adjust an EGR valve and to control a fuel injection quantity, a fuel injection timing and a fuel injection pattern, are executed so that it becomes a rich-burn in the substantial ratio of λ=1 by referring to the map data.

In the step S41 and S42, referring to the map data, the EGR quantity is set, and rich-burn control values such as a throttle opening, a fuel injection quantity, a fuel injection timing and a fuel injection pattern are set to provide a rich-burn where the excess air factor λ is near 1, and in the step S43, the large quantity EGR regeneration control is executed (for a predetermined period of time) based on the setting.

Namely, a large quantity cool EGR control for recirculating a large quantity of EGR gas cooled by an EGR cooler 41 is executed. At the same time, the controls of throttling further the throttle butterfly 23 and adjusting throttling angle thereof are executed with the feedback of output values from an λ sensor so that the air quantity becomes the one to generate the torque as large as the torque generated under a lean-burn operation, according to the map data set previously from test results.

Consequently, cool EGR is refluxed as much as the intake air throttled by the throttle butterfly 23. And the combustion is realized in the engine with the excess air factor λ equal to 1.0 or less with a large quantity of EGR gas and a small quantity of intake air. In the combustion with the excess air factor λ equal to 1.0 or less, the torque control is performed by the intake quantity control since the generated torque can not be controlled by the fuel injection quantity.

In addition, in order to reduce smoke generated by the combustion, the fuel injection is executed by a multi-stage injection and, what is more, an early injection (advanced up to premixed combustion). The mixing of the fuel and the gas in the cylinder is accelerated by the injection pattern. Besides, a smokeless burning is realized, because the combustion temperature does not rise as high as soot is generated in an atmosphere where a large quantity of cooled inert gas (EGR gas) exists. However, HC and CO extremely increase as the excess air factor λ decreases.

In the exhaust gas discharged by the control, $O_2$ concentration becomes 0%, while the quantity of HC and CO becomes the level necessary for the regeneration by the control of the excess air factor λ.

Then, when the exhaust gas of 0% concentration of $O_2$ and high concentration of HC and CO flows in, the occluded $NO_2$ is released from NOx occlusion reduction type catalyst 30 of high temperature to regenerate the NOx occlusion reduction type catalyst 30 and, at the same time, the released $NO_2$ is reduced by HC and CO in the exhaust gas, and purified by becoming $N_2$, $H_2O$ and $CO_2$. HC and CO in the exhaust gas also are not discharged outside as they are consumed as reducer of $NO_2$.

Then, the regeneration control operation is terminated by the judgment of catalyst regeneration termination in the step S44, if it exceeds the operation time set by the map data "engine speed and rich-burn period of time map" predetermined from test results and so on. By the termination, the value of NOx occlusion quantity used for judging whether the regeneration operation is necessary or not is reset to zero in the step S45.

By the series of operations from the step S41 to S45, the regeneration control operation is completed, returning to the step S10 shown in FIG. 6. Then, the steps from S10 to S40 of the control flow are executed repeatedly, and the control flow is suspended (STOP) and terminated (END) by an interruption of a termination command such as engine key OFF.

Consequently, according to the exhaust gas purifying system 1 provided with the NOx occlusion reduction type catalyst 30 and the method of exhaust gas purification, the NOx occlusion reduction type catalyst can be heated up and activated preliminarily, because the catalyst activation control operation is performed by the exhaust gas temperature raising control as a preliminary regeneration operation, immediately before performing the rich-burn control operation accompanied by EGR, in order to regenerate the NOx occlusion reduction type catalyst 30.

Therefore, $NO_2$ released from the NOx occluding substance can be reduced sufficiently to $N_2$ through catalysis and purified and a high NOx removal ratio can be achieved, even if a rich-burn control operation by EGR is performed supplying a large quantity of cool EGR gas into the cylinder.

Especially, a peak of high NOx concentration can be prevented from appearing in the early stage of the regeneration when the rich-burn operation means starts to regenerate the NOx occlusion reduction type catalyst, by the rich-burn operation accompanied by EGR, and the NOx removal efficiency can be prevented from deteriorating.

INDUSTRIAL APPLICABILITY

The present invention can provide a method of exhaust gas purification and an exhaust gas purifying system provided with a nitrogen oxides occlusion reduction type catalyst that can reduce a NOx even if a rich burning control operation accompanied by EGR is performed during the regeneration control operation and improve the NOx purifying performance.

And, the exhaust gas purifying system and the method of exhaust gas purification can be used for removing a NOx in the exhaust gas from the internal combustion engine such as a diesel engine and certain gasoline engines and various combustion apparatus.

What is claimed is:

1. A method for purifying exhaust gas provided with a $NO_x$ occlusion reduction type catalyst in an exhaust passage of a diesel engine, comprising:
    executing a normal control operation;
    detecting a regeneration control initiation timing for said catalyst;
    executing a rich-burn control operation and generating an exhaust gas which is in a fuel-rich state, accompanying recirculation of EGR gas; and
    activating a catalyst metal of said catalyst immediately before said rich-burn control operation is performed,
    wherein said catalyst includes a $NO_x$ occluding substance that is transformed into nitrate as a result of occluding activities, which is then regenerated back to allow continuation of $NO_x$ occlusion, and
    wherein said catalyst activation control operation executes a burning control operation in the condition of an EGR valve being totally closed, and at the same time, controlling the torque generation of the diesel engine by an intake control to reduce the torque variation during the transition from the normal control operation to the catalyst activation control operation.

2. A method of exhaust gas purification to be carried out with use of an exhaust gas purifying system with a $NO_x$ occlusion reduction type catalyst having a catalyst metal and a $NO_x$ occluding substance, in an exhaust passage of a diesel engine, and a control unit comprising a normal control operation means, a regeneration control initiation judging means for detecting a regeneration control initiation timing for said $NO_x$ occlusion reduction type catalyst, a rich-burn control operation means for executing a control operation for generating an exhaust gas which is in a fuel-rich state, accompanying recirculation of exhaust gas, and a catalyst activation control operation means for executing a control operation for activating said catalyst metal immediately before said rich-burn operation is performed, and performing a catalyst activation control operation by said catalyst activation control operation means when it is judged by said regeneration control initiation judging means that a regeneration control for the regeneration of the $NO_x$ occlusion reduction type catalyst is to be initiated and thereafter executing a rich-burn control operation accompanying a recirculation of EGR gas by said rich-burn control operation means to thereby regenerate said $NO_x$ occlusion reduction type catalyst, wherein in the course of said catalyst activation control operation, a burning control operation in the vicinity of the stoichiometric air/fuel ratio in the range of 0.8 to 1.1 in terms of an excess fuel factor is performed in the condition of the EGR valve being totally closed, and at the same time, a multi-stage injection and an early injection is executed in the fuel injection into cylinders and the torque control of the torque generation of the diesel engine by an intake control to reduce the torque variation during the transition from the normal control operation to the catalyst activation control operation, is executed, and
    wherein regeneration control is performed, to thereby purge or release NOx from a NOx occlusion reduction type catalyst.

3. The method of exhaust gas purification of claim 2, wherein:
    said $NO_x$ occlusion reduction type catalyst comprises a reducer occluding substance.

4. The method of exhaust gas purification of claim 2, which comprises performing said rich-burn control operation to recirculate EGR gas to generate an exhaust gas which is in a fuel-rich state and to control the torque generation of the diesel engine by an intake control of the diesel engine to reduce the torque variation during the transition from catalyst activation control operation to the rich-burn control operation or from the rich-burn control operation to the normal control operation.

5. An exhaust gas purifying system provided with a $NO_x$ occlusion reduction type catalyst having a catalyst metal and a $NO_x$ occluding substance, in an exhaust passage of a diesel engine, and a control unit comprising a normal control operation means, a regeneration control initiation judging means for detecting a regeneration control initiation timing for said $NO_x$ occlusion reduction type catalyst, a rich-burn control operation means for executing a rich-burn control operation for generating an exhaust gas which is in a fuel-rich state, accompanying recirculation of EGR gas, and a catalyst activation control operation means for executing a control operation for activating said catalyst metal immediately before said rich-burn control operation is performed;
    wherein said catalyst activation control operation means executing a burning control operation in the vicinity of the stoichiometric air/fuel ratio in a range of 0.8 to 1.1 in terms of an excess air factor, in the condition of an EGR valve being totally closed, and at the same time, executing a multi-stage injection and an early injection in the fuel injection into cylinders and controlling the torque generation of the diesel engine by an intake control to reduce the torque variation during the transition from the normal control operation to the catalyst activation control operation, and
    wherein regeneration control is performed, to thereby purge or release NOx from a NOx occlusion reduction type catalyst.

6. The exhaust gas purifying system of claim 1, wherein:
    said $NO_x$ occlusion reduction type catalyst comprises a reducer occluding substance.

7. The exhaust gas purifying system of claim 1 wherein:
    said rich-burn control operation means recirculates EGR gas for generating an exhaust gas which is in a fuel-rich state and controls the torque generation of the diesel engine by an intake control of the diesel engine to reduce the torque variation during the transition from catalyst activation control operation to the rich-burn control operation or from the rich-burn control operation to the normal control operation.

* * * * *